US009784634B2

(12) United States Patent
Yamada

(10) Patent No.: US 9,784,634 B2
(45) Date of Patent: *Oct. 10, 2017

(54) PRESSURE SENSOR

(71) Applicant: NAGANO KEIKI CO., LTD., Tokyo (JP)

(72) Inventor: Nobuaki Yamada, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 14/938,436

(22) Filed: Nov. 11, 2015

(65) Prior Publication Data

US 2016/0146690 A1 May 26, 2016

(30) Foreign Application Priority Data

Nov. 20, 2014 (JP) .................................. 2014-235834

(51) Int. Cl.
*G01L 19/14* (2006.01)
*G01L 19/00* (2006.01)
(Continued)

(52) U.S. Cl.
CPC .............. *G01L 19/147* (2013.01); *G01B 7/18* (2013.01); *G01L 9/0051* (2013.01); *G01L 19/003* (2013.01); *F16L 29/02* (2013.01)

(58) Field of Classification Search
CPC .......................... G01L 19/147; G01L 19/003
See application file for complete search history.

(56) References Cited

U.S. PATENT DOCUMENTS 4,599,903 A 7/1986 Ferris
4,966,533 A * 10/1990 Uchida ................... F04B 43/04
417/413.1
(Continued)

FOREIGN PATENT DOCUMENTS

JP H09 5196 1/1997
JP 2002-039901 2/2002
(Continued)

OTHER PUBLICATIONS

European Search Report dated Apr. 20, 2016, 5 pages.
Japanese Notice of Allowance dated May 23, 2017, 2 pages.

*Primary Examiner* — Lisa Caputo
*Assistant Examiner* — Tran M Tran
(74) *Attorney, Agent, or Firm* — Rankin, Hill & Clark LLP

(57) ABSTRACT

A pressure sensor includes: a pressure sensor element; an adapter integrally attached to the pressure sensor element and defining therein a hole where a pressure of a fluid to be measured is introduced to the pressure sensor element; a fitting member having a housing recess housing the adapter and connectable to a connected member; and a pressing member pressing a valve of the connected member and defining a communicating path through which a flow path where the pressure of the fluid is introduced is in communication with the hole of the adapter. The fitting member is made of a synthetic resin. An O-ring is interposed between a circumferential surface of the adapter and the fitting member. The adapter is a synthetic resin member, and includes a contact portion brought into contact with the adapter and a pressing portion pressing the valve. The pressing member is welded to the fitting member.

5 Claims, 2 Drawing Sheets

(51) Int. Cl.
  *G01B 7/16* (2006.01)
  *G01L 9/00* (2006.01)
  *F16L 29/02* (2006.01)

(56) References Cited

U.S. PATENT DOCUMENTS

| | | | | |
|---|---|---|---|---|
| 5,535,629 | A * | 7/1996 | Gerdes | G01L 9/0075 73/715 |
| 5,587,601 | A * | 12/1996 | Kurtz | G01L 19/0038 257/417 |
| 5,792,958 | A * | 8/1998 | Speldrich | G01L 19/06 338/42 |
| 5,939,637 | A * | 8/1999 | Pitzer | G01L 19/14 73/715 |
| 5,973,408 | A * | 10/1999 | Nagasaka | H01L 23/485 257/751 |
| 6,298,730 | B1 * | 10/2001 | Yamagishi | G01L 19/0084 73/723 |
| 6,474,170 | B1 * | 11/2002 | Yamagishi | G01L 9/0051 73/723 |
| 6,584,851 | B2 * | 7/2003 | Yamagishi | G01L 19/0084 73/715 |
| 6,604,429 | B1 * | 8/2003 | Pitzer | G01L 19/0038 73/715 |
| 6,619,132 | B2 * | 9/2003 | Imai | G01L 19/0069 73/727 |
| 6,769,308 | B1 * | 8/2004 | Pitzer | B60C 23/0408 73/700 |
| 7,150,198 | B2 * | 12/2006 | Kaneko | G01L 9/0051 73/756 |
| 7,165,459 | B2 * | 1/2007 | Tohyama | G01L 19/003 73/715 |
| 7,377,177 | B1 | 5/2008 | Lamb et al. | |
| 7,568,834 | B2 * | 8/2009 | Seki | G01D 11/24 374/147 |
| 7,581,448 | B2 * | 9/2009 | Iimori | G01L 9/0051 73/714 |
| 7,627,943 | B2 * | 12/2009 | Tohyama | G01L 19/003 257/417 |
| 7,640,812 | B2 * | 1/2010 | Iimori | G01L 19/0061 73/715 |
| 7,748,276 | B2 * | 7/2010 | Kaneko | G01L 9/0051 73/720 |
| 8,191,423 | B2 * | 6/2012 | Chiou | G01L 9/0052 73/721 |
| 8,286,496 | B2 * | 10/2012 | Sekiya | G01L 19/142 73/715 |
| 8,459,125 | B2 * | 6/2013 | Wade | G01L 19/0007 73/753 |
| 8,863,578 | B2 * | 10/2014 | Kanomata | G01L 9/0002 73/700 |
| 9,389,134 | B2 * | 7/2016 | Iimori | G01L 19/0069 |

FOREIGN PATENT DOCUMENTS

| | | |
|---|---|---|
| JP | 2002-372476 | 12/2002 |
| JP | 2004-045253 | 2/2004 |
| JP | 2005-283253 | 10/2005 |
| JP | 4043874 | 11/2007 |

* cited by examiner

PRESSURE SENSOR

The entire disclosure of Japanese Patent Application No. 2014-235834 filed Nov. 20, 2014 is expressly incorporated by reference herein.

TECHNICAL FIELD

The present invention relates to a pressure sensor.

BACKGROUND ART

Some pressure sensors are configured to measure a pressure of a fluid to be measured flowing through an inside of a pipe. The pressure sensors include a pressure sensor including a joint connectable to a connected member of the pipe, the joint being provided with a pin for opening a valve of the connected member.

A typical example of this pressure sensor includes: a joint connectable to a connected member; a pressure sensor element welded to the joint; and an operation member provided to the joint, in which a valve provided in advance to the connected member is opened using the operation member in connecting the joint to the connected member (see, for instance, Patent Literature 1: Japanese Patent No. 4043874).

According to Patent Literature 1, the operation member is a pin, which includes a stepped cylindrical member and is welded to the joint. The joint and the pressure sensor element are welded to each other.

Another typical example of the pressure sensor includes: a printed circuit board (PCB) including a substrate; a carrier provided to a first surface of the substrate; a pressure converting member provided to a second surface of the substrate; and a fitting provided with the substrate (see, for instance, Patent Literature 2: U.S. Pat. No. 7,377,177).

According to Patent Literature 2, the carrier, which is fitted to a valve (e.g., a Schrader valve), functions as a pin of Patent Literature 1, and is made of metal. The fitting functions as the joint of Patent Literature 1.

However, the pin (i.e., the operation member) of Patent Literature 1, which is welded to the joint along the entire circumference thereof, should be made of metal, and sealability between the pin and the joint welded to each other is ensured. The metal pin includes, for instance, a stainless-steel cylindrical member that is to be subjected to a process such as grinding. Such a troublesome process limits the mass-production of the pin, which results in an increase in the production costs of the pin. Further, the joint, which is welded to the pressure sensor element, is also made of metal. Therefore, an increase in the weight of the sensor is inevitable due to an increase in the number of metal members.

Patent Literature 2 also entails the same problems as those of the typical device of Patent Literature 1 because the carrier, which corresponds to the pin of Patent Literature 1, is made of metal.

SUMMARY OF THE INVENTION

An object of the invention is to provide a light-weight pressure sensor including an easily manufacturable operation member.

According to an aspect of the invention, a pressure sensor includes: a pressure sensor element displaceable by a pressure of a fluid to be measured introduced through a connected member; an adapter integrally attached to the pressure sensor element, the adapter defining therein a hole through which the pressure of the fluid to be measured is introduced to the pressure sensor element; a fitting member provided with a housing recess for housing the adapter, the fitting member being connectable to the connected member, the fitting member being made of a synthetic resin; a pressing member for pressing a valve provided to the connected member, the pressing member defining a communicating path through which a flow path of the connected member, in which the pressure of the fluid to be measured is introduced, is in communication with the hole of the adapter, the pressing member being a synthetic resin member including: a contact portion brought into contact with the adapter; and a pressing portion provided on a side opposite to the contact portion to press the valve; and an O-ring interposed between a circumferential surface of the adapter and the fitting member, the pressing member and the fitting member being welded to each other.

In the above aspect, the synthetic resin fitting member is welded to the synthetic resin pressing member while being sealed with the adapter by the O-ring, thereby preventing leakage of the fluid to be measured between these components.

When the fitting member and the pressing member (i.e., a pin) are made of a synthetic resin, the weight of the sensor can be reduced. Further, the fitting member and the pressing member can be easily formed in a predetermined shape by, for instance, injection molding, so that the fitting member and the pressing member can be mass-produced to reduce costs thereof.

In the above aspect, it is preferable that the pressing member includes: a flange welded to the fitting member at a periphery thereof a pin body integral with the flange, the pin body having a distal end defined as the pressing portion for pressing the valve, the fitting member includes a joint that is to be screwed with the connected member, the joint is provided with a pressing member fitting hole in which the pressing member is to be fitted, the pressing member fitting hole being continuous with the housing recess, and the joint and the flange are welded to each other along an inner periphery of the pressing member fitting hole.

In the above aspect, after the adapter is set in the housing recess and then the pressing member is inserted in the pressing member fitting hole, the joint and the flange of the pressing member are welded to each other along the inner periphery of the pressing member fitting hole. Since the flange has a larger diameter than that of the pin body, the pressing member can be easily welded to the joint.

In the above aspect, it is preferable that the pressure sensor element is a metal member including: a diaphragm including a strain gauge; and a cylindrical portion in which the pressure of the fluid to be measured is introduced, the cylindrical portion being connected to an outer periphery of the diaphragm, the cylindrical portion having an open end welded to an end of the adapter.

In the above aspect, the pressure sensor element and the adapter, which are united by welding, can be easily attached to the fitting member. An assembly process of the pressure sensor can thus be facilitated.

In the above aspect, it is preferable that an outer circumferential surface of the adapter is provided with a fitting groove in which the O-ring is fitted.

In the above aspect, the adapter can be attached to the fitting member with the O-ring being mounted on the adapter, thereby facilitating the assembly process of the pressure sensor.

The above aspect of the invention can provide a lightweight pressure sensor including an easily manufacturable pressing member.

BRIEF DESCRIPTION OF DRAWING(S)

DESCRIPTION OF EMBODIMENT(S)

Exemplary embodiment(s) of the invention will be described below with reference to the attached drawings.

Figure 1:
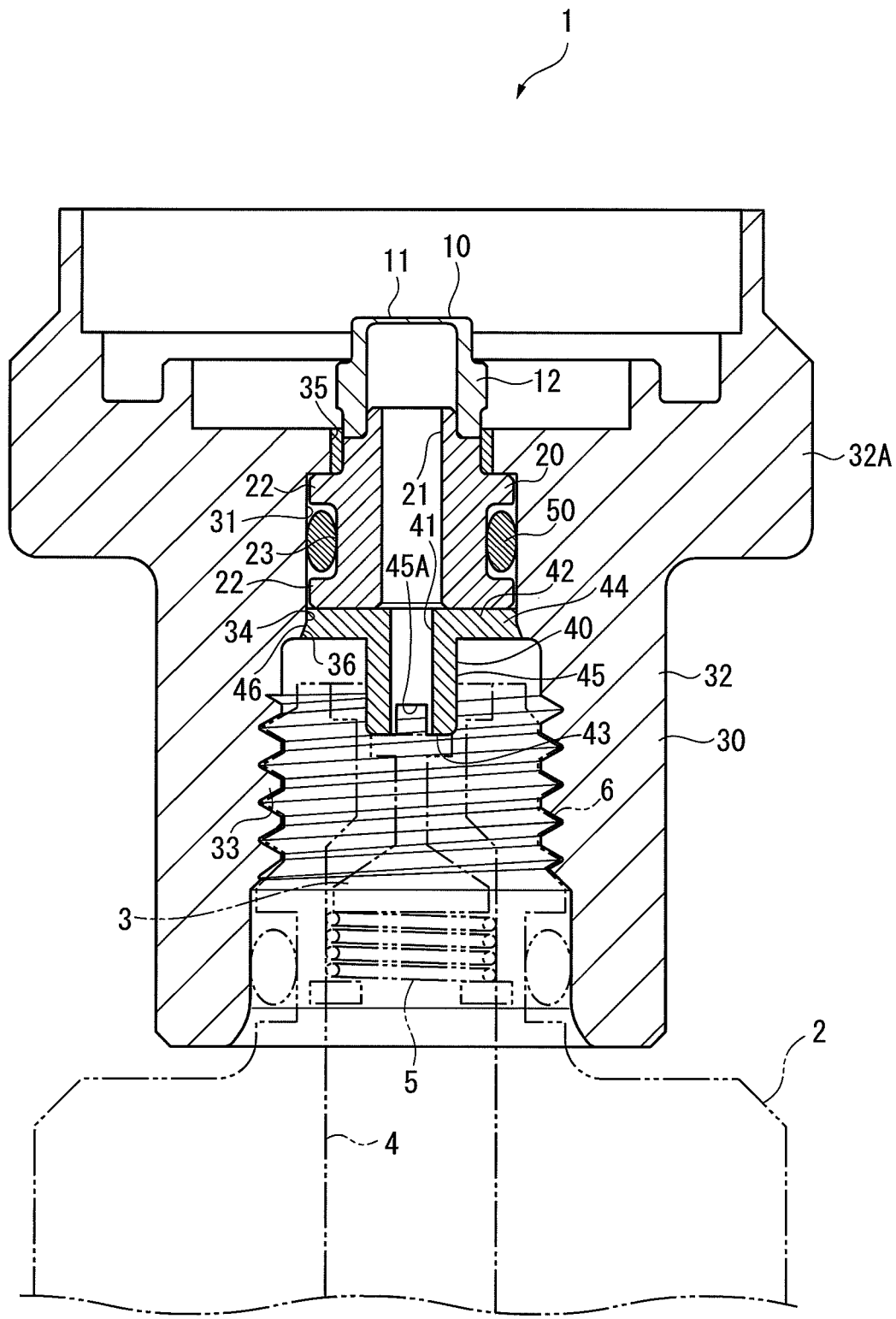
FIG. 1 is a sectional view showing a pressure sensor according to an exemplary embodiment of the invention.
Figure 2:
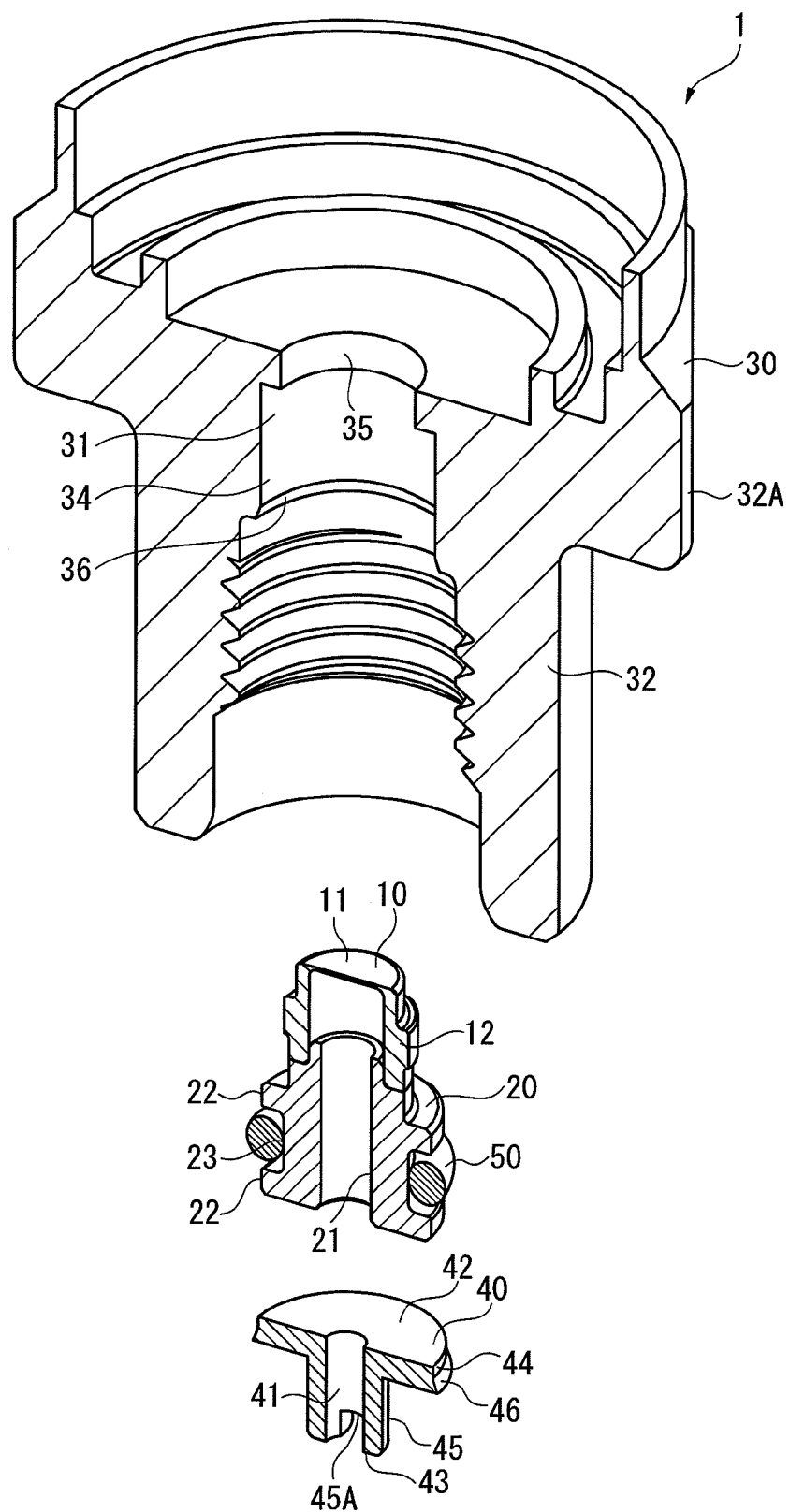
FIG. 2 is an exploded perspective view showing the pressure sensor.

As shown in FIGS. 1 and 2, a pressure sensor 1 of an exemplary embodiment is configured to measure a pressure of a fluid to be measured for an in-vehicle air conditioner, and is attachable to a connected member 2 such as a pipe-side joint provided to a pipe (not shown) where the fluid to be measured flows.

Specifically, the pressure sensor 1 includes: a pressure sensor element 10 displaceable by the pressure of the fluid to be measured introduced through the connected member 2; an adapter 20 integrally attached to the pressure sensor element 10, the adapter 20 defining therein a hole 21 through which the pressure of the fluid to be measured is introduced to the pressure sensor element 10; a fitting member 30 provided with a housing recess 31 for housing the adapter 20, the fitting member 30 being connectable to the connected member 2; and a pressing member 40 for pressing a valve 3 provided to the connected member 2, the pressing member 40 defining a communicating path 41 through which a flow path 4 of the connected member 2, in which the pressure of the fluid to be measured is introduced, is in communication with the hole 21 of the adapter 20, the pressing member 40 being welded to the fitting member 30. It should be noted that a reference numeral 5 in FIG. 1 denotes a coil spring biasing the valve 3 toward the pressing member 40.

The pressure sensor element 10, which is a metal member made of, for instance, stainless steel, includes: a diaphragm 11 including a strain gauge; and a cylindrical portion 12 connected to an outer periphery of the diaphragm 11. The pressure of the fluid to be measured is introduced into the cylindrical portion 12.

The adapter 20 includes a pair of large-diameter portions 22 projecting radially outward from an outer circumferential surface thereof, the large-diameter portions 22 being spaced from each other along a communication direction of the hole 21. The large-diameter portions 22 are each circumferentially continuous. The outer circumferential portion of the adapter 20 is provided with a fitting groove 23 at a position between the large-diameter portions 22 axially spaced from each other. An O-ring 50 is fitted in the fitting groove 23. The adapter 20, which is also made of metal such as stainless steel, has an end welded to an open end of the cylindrical portion 12 of the pressure sensor element 10 along the entire circumference thereof by, for instance, laser welding.

The fitting member 30, which is made of a synthetic resin such as poly phenylene sulfide resin (PPS), includes a cylindrical joint 32 that is to be screwed with the connected member 2. The joint 32 has an inner surface provided with a female thread 33 engageable with a male thread 6 of the connected member 2 screwed in the joint 32. An outer circumferential portion of an end of the joint 32 is provided with an operation portion 32A designed to fit in a hand tool such as a hex wrench. In the fitting member 30, a pressing member fitting hole 34, in which the pressing member 40 is to be fitted, is provided on a screwed side facing the connected member 2 relative to the housing recess 31. The pressing member fitting hole 34 is continuous with the housing recess 31.

In the housing recess 31, the O-ring 50 is interposed between a circumferential surface of the adapter 20 and the fitting member 30. An open end of the housing recess 31 opposite to the pressing member fitting hole 34 is provided with a small-diameter hole 35. One of the pair of large-diameter portions 22 of the adapter 20 closer to the pressure sensor element 10 is in contact with a step defined on a lower side of the small-diameter hole 35 in the figure.

The pressing member 40, which is made of a synthetic resin such as PPS, includes: a contact portion 42 brought into contact with the adapter 20; a pressing portion 43 disposed opposite to the contact portion 42 to press the valve 3; a flange 44 integral and coplanar with the contact portion 42, the flange 44 having a periphery welded to the joint 32 of the fitting member 30; and a pin body 45 integral with the flange 44. A distal end of the pin body 45 is defined as the pressing portion 43 for pressing the valve 3. The pin body 45 is provided with a cut hole 45A through which the communicating path 41 is in communication with the outside thereof. The flange 44 and the fitting member 30 are welded to each other along an inner periphery of the pressing member fitting hole 34.

Specifically, an inner periphery of the pressing member fitting hole 34 facing the connected member 2 has a tapered surface 36 flared from the housing recess 31, and the flange 44 similarly has a tapered surface 46 inclined to face the tapered surface 36. The flange 44 and the fitting member 30 are laser-welded or heat-welded to each other along a boundary therebetween through an opening of the joint 32 with the tapered surfaces 36, 46 being in close contact with each other.

In addition to the above components, the pressure sensor 1 also includes: an annular insulating member (e.g., a PCB or any resin member) mounted on the fitting member 30 to surround the pressure sensor element 10; an output terminal for taking out signals provided to the insulating member, the output terminal being electrically connected to the strain gauge of the pressure sensor element 10 through, for instance, wire bonding; and a cover that covers these components. It should be noted that these components are not shown in FIGS. 1 and 2.

Description will be made below on an assembly process of a main part of the pressure sensor 1 and an operation of the pressure sensor 1.

First, as shown in FIG. 2, the pressure sensor element 10 and the adapter 20 is united into a sensor module assembly in advance by fitting the pressure sensor element 10 on an end of the adapter 20, and, for instance, laser-welding the fitted portion along the entire circumference thereof. The O-ring 50 is then fitted in the fitting groove 23 of the adapter 20. Subsequently, the sensor module assembly and the pressing member 40 are inserted in this order into the fitting member 30 from a side of the fitting member 30 connectable to the connected member 2 to be fitted in the housing recess 31 and in the pressing member fitting hole 34, respectively.

Consequently, one of the large-diameter portions 22 of the adapter 20 is brought into contact with the periphery of the small-diameter hole 35 in the housing recess 31, and the tapered surface 46 of the pressing member 40 is brought into contact with the tapered surface 36 of the fitting member 30. In other words, the sensor module assembly is held between a surrounding wall of the small-diameter hole 35 and the pressing member 40. The pressure sensor element 10 projects outside of the fitting member 30 through the small-diameter hole 35 of the housing recess 31. The O-ring 50 is interposed between the fitting member 30 and the adapter 20 to ensure sealability therebetween.

Next, the pressing member 40 is welded to the fitting member 30 from the opening of the joint 32 with the tapered surface 46 of the pressing member 40 being in contact with the tapered surface 36 of the fitting member 30. Any welding technique such as laser welding and heat welding is usable.

The pressure sensor element 10, the adapter 20, the pressing member 40 and the O-ring 50 are thus incorporated in the fitting member 30, thereby completing the assembly process of the main part of the pressure sensor 1.

It should be noted that an adhesive may be applied between the sensor module assembly and the small-diameter hole 35 to prevent rotation of the sensor module assembly, as shown by hatching in FIG. 1.

As the joint 32 is screwed with the connected member 2 to attach the pressure sensor 1 to the connected member 2, the pressing portion 43 of the pressing member 40 is brought into contact with a distal end of the valve 3 to push back the valve 3 against the spring force of the coil spring 5. Consequently, the flow path 4 of the connected member 2 is opened, so that the pressure of the fluid to be measured introduced from the flow path 4 acts on the pressure sensor element 10 through the cut hole 45A of the pressing member 40, the communicating path 41 and the hole 21. An electrical output corresponding to the pressure, which is generated by the strain gauge, is then outputted outside through the output terminal (not shown).

The exemplary embodiment provides the following effects (1) to (4).

(1) In the pressure sensor 1, the synthetic resin fitting member 30 is welded to the synthetic resin pressing member 40 while being sealed with the adapter 20 by the O-ring 50, thereby preventing leakage of the fluid to be measured between these components.

The pressure sensor 1 can thus be reduced in weight due to the fitting member 30 and the pressing member 40 (i.e., a pin) being made of a synthetic resin. Further, the fitting member 30 and the pressing member 40 can be easily formed in a predetermined shape by, for instance, injection molding, so that the fitting member 30 and the pressing member 40 can be mass-produced to reduce costs thereof.

(2) In the pressure sensor 1, the adapter 20 united with the pressure sensor element 10 is inserted into the housing recess 31 from the side connectable to the connected member 2, and then the pressing member 40 is similarly inserted into the pressing member fitting hole 34. Subsequently, the fitting member 30 is welded to the flange 44 of the pressing member 40 along the inner periphery of the pressing member fitting hole 34. The pressing member 40 can thus be easily welded to the joint 32 due to the flange 44 having a larger diameter than that of the pin body 45.

(3) In the pressure sensor 1, the pressure sensor element 10 and the adapter 20, which are united by welding, can be easily attached to the fitting member 30. The assembly process of the pressure sensor 1 can thus be facilitated.

(4) The outer circumferential portion of the adapter 20 is provided with the fitting groove 23, in which the O-ring 50 can be fitted. The adapter 20 can thus be attached to the fitting member 30 with the O-ring 50 being mounted on the adapter 20, which also results in facilitating the assembly process of the pressure sensor 1.

Incidentally, the invention is not limited to the above exemplary embodiment, but includes modifications and improvements as long as an object of the invention can be achieved.

For instance, although the pressure sensor element 10, which includes the diaphragm 11 provided with the strain gauge, is of an electric resistance type in the exemplary embodiment, a pressure sensor element according to the present invention may be of an electrostatic type that measures a pressure based on an electrostatic capacity variable with the displacement of a diaphragm, or may be a so-called micro electro mechanical system (MEMS) sensor manufactured using a microfabrication technique for semiconductors.

Although the fitting member 30 is provided with the female thread 33, and the connected member 2 is provided with the male thread 6 in the exemplary embodiment, the fitting member may be provided with a male thread, and the connected member may be provided with a female thread.

A resin material for the fitting member and the pressing member according to the invention is not limited to PPS, but may be determined in view of, for instance, the composition of a fluid in use and/or a required mechanical strength.

What is claimed is:

1. A pressure sensor comprising:
a pressure sensor element displaceable by a pressure of a fluid to be measured introduced through a connected member;
an adapter integrally attached to the pressure sensor element, the adapter defining therein a hole through which the pressure of the fluid to be measured is introduced to the pressure sensor element;
a fitting member provided with a housing recess for housing the adapter, the fitting member being connectable to the connected member, the fitting member being made of a synthetic resin;
a pressing member for pressing a valve provided to the connected member, the pressing member defining a communicating path through which a flow path of the connected member, in which the pressure of the fluid to be measured is introduced, is in communication with the hole of the adapter, the pressing member being a synthetic resin member comprising:
a contact portion brought into contact with the adapter; and
a pressing portion provided on a side opposite to the contact portion to press the valve; and
an O-ring interposed between a circumferential surface of the adapter and the fitting member, the pressing member and the fitting member being welded to each other.

2. The pressure sensor according to claim 1, wherein
the pressing member comprises:
a flange welded to the fitting member at a periphery thereof;
a pin body integral with the flange, the pin body having a distal end defined as the pressing portion for pressing the valve,
the fitting member comprises a joint that is to be screwed with the connected member,
the joint is provided with a pressing member fitting hole in which the pressing member is to be fitted, the pressing member fitting hole being continuous with the housing recess, and
the joint and the flange are welded to each other along an inner periphery of the pressing member fitting hole.

3. The pressure sensor according to claim 1, wherein the pressure sensor element is a metal member comprising:

a diaphragm comprising a strain gauge; and a cylindrical portion in which the pressure of the fluid to be measured is introduced, the cylindrical portion being connected to an outer periphery of the diaphragm, the cylindrical portion having an open end welded to an end of the adapter.

4. The pressure sensor according to claim 1, wherein an outer circumferential surface of the adapter is provided with a fitting groove in which the O-ring is fitted.

5. The pressure sensor according to claim 1, wherein the pressing member comprises a first tapered surface and the fitting member comprises a second tapered surface, the first and second tapered surfaces facing each other, and the first tapered surface of the pressing member and the second tapered surface of the fitting member are welded to each other.

* * * * *